United States Patent
Yin et al.

(10) Patent No.: US 9,143,708 B2
(45) Date of Patent: Sep. 22, 2015

(54) DUAL LOW VOLTAGE LEVELS FOR CONTROL OF TRANSFER SWITCH DEVICE IN PIXEL ARRAY

(71) Applicant: Himax Imaging, Inc., Grand Cayman (KY)

(72) Inventors: Ping-Hung Yin, Grand Cayman (KY); Amit Mittra, Grand Cayman (KY); Kaveh Moazzami, Grand Cayman (KY); Satya Narayan Mishra, Grand Cayman (KY)

(73) Assignee: Himax Imaging, Inc., Grand Cayman (KY)

( * ) Notice: Subject to any disclaimer, the term of this patent is extended or adjusted under 35 U.S.C. 154(b) by 58 days.

(21) Appl. No.: 14/102,520

(22) Filed: Dec. 11, 2013

(65) Prior Publication Data

US 2015/0163423 A1 Jun. 11, 2015

(51) Int. Cl.
*H04N 5/235* (2006.01)
*H04N 5/359* (2011.01)
*H04N 5/378* (2011.01)
*H04N 5/355* (2011.01)

(52) U.S. Cl.
CPC ......... *H04N 5/3591* (2013.01); *H04N 5/35581* (2013.01); *H04N 5/378* (2013.01)

(58) Field of Classification Search
None
See application file for complete search history.

(56) References Cited

U.S. PATENT DOCUMENTS

2009/0262215 A1* 10/2009 Sano et al. ................. 348/229.1
2012/0056080 A1* 3/2012 Levine et al. .............. 250/214 P
2014/0267884 A1* 9/2014 Shen et al. .................... 348/362

* cited by examiner

*Primary Examiner* — Aung S Moe
*Assistant Examiner* — Euel Cowan
(74) *Attorney, Agent, or Firm* — Winston Hsu; Scott Margo

(57) ABSTRACT

A pixel array comprises at least one long exposure pixel, short exposure pixel, and a control circuit. The long exposure pixel comprises a first photodiode to generate charges, a first image signal generating module for generating a first image sensing signal; and a first transfer switch device for passing the charges to the first image signal generating module via a first transfer control signal. The control circuit sets the first transfer control signal to be a first predetermined control voltage when the long exposure pixel is in an long exposure phase, and then sets the first transfer control signal to be a second predetermined control voltage when the short exposure pixel is in a short exposure phase.

8 Claims, 5 Drawing Sheets

DUAL LOW VOLTAGE LEVELS FOR CONTROL OF TRANSFER SWITCH DEVICE IN PIXEL ARRAY

BACKGROUND OF THE INVENTION

1. Field of the Invention

The present invention relates to an image sensor, and particularly relates to an image sensor with an anti-blooming mechanism.

2. Description of the Prior Art

A pixel of an image sensor has a photodiode to generate charges according to light and a transfer switch coupled to the photodiode to control the charges selectively output to a floating diffusion. In order to well control the charge leakage, for example the transfer switch being an n-type transistor, a negative control voltage is provided to a control terminal of the transfer switch. Under exposure, the photo diode converts light into charges. If the light is too bright, however, a large quantity of charges are generated and accumulated in the photodiode, and leakage current may likely occur to affect the neighboring pixels. Such situation is called blooming.

Therefore, a good mechanism for avoiding the bloom issue is needed.

SUMMARY OF THE INVENTION

Therefore, one objective of the present invention is to provide an image sensor that can avoid the bloom issue.

Another objective of the present invention is to provide a pixel array that can avoid the bloom issue.

One embodiment of the present invention discloses. A pixel array comprises at least one long exposure pixel, short exposure pixel, and a control circuit. The long exposure pixel comprises a first photodiode to generate charges, a first image signal generating module for generating a first image sensing signal; and a first transfer switch device for passing the charges to the first image signal generating module via a first transfer control signal. The short exposure pixel comprises a second photodiode to generate charges; a second image signal generating module for generating a second image sensing signal; and a second transfer switch device for passing the charges to the second image signal generating module according to a second control signal. The control circuit sets the first transfer control signal to be a first predetermined control voltage when the long exposure pixel is in an long exposure phase, and then sets the first transfer control signal to be a second predetermined control voltage when the short exposure pixel is in a short exposure phase.

The above-mentioned pixel array is not limited to be applied to the image sensor but can be applied to other devices.

In view of above-mentioned embodiments, the control terminals for the long exposure pixel and the short exposure pixel are asserted to a higher level before the data in the pixels are read. Therefore the photo diode accumulates less charge and the leakage current is suppressed. By this way, the bloom issue can be reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
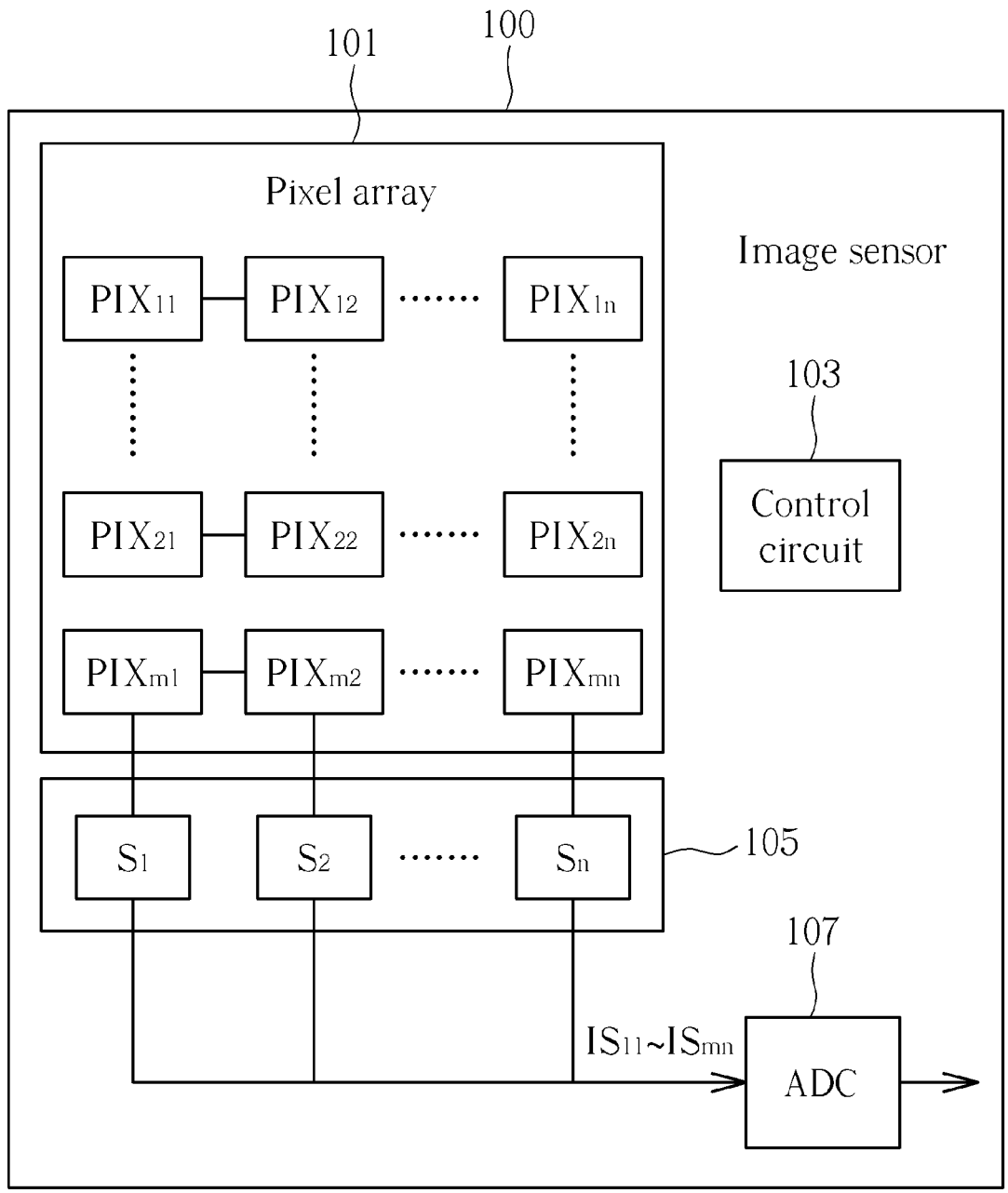
FIG. 1 is a block diagram illustrating an image sensor according to an embodiment of the present invention.

FIG. 1 is a block diagram illustrating an image sensor 100 according to an embodiment of the present invention. As shown in FIG. 1, the image sensor 100 comprises a pixel array 101, a control circuit 103, a read circuit 105 and an analog to digital converter 107. The pixel array 101 comprises a plurality of pixels $PIX_{11}$-$PIX_{mn}$ to generate the image signals $IS_{11}$-$IS_{mn}$. The read circuit 105 comprises a plurality of read units $S_1$-$S_n$, which are arranged to read image signals $IS_{11}$-$IS_{mn}$ from the pixels $PIX_{11}$-$PIX_{mn}$. The analog to digital converter 107 generates a frame according the image signals $IS_{11}$-$IS_{mn}$. The control circuit 103 controls the operations for each device in the image sensor 100. That is, the control circuit 103 can control the reset time, the exposure time and the read operation for the pixels $PIX_{11}$-$PIX_{mn}$.

The pixel array in an image sensor, in one embodiment, may have long exposure pixels and short exposure pixels, such that a high dynamic range (HDR) image is generated. The bloom issue is seriously concerned if the long exposure pixel and the short exposure pixel are beside each other. Therefore, a pixel array having long exposure pixels and short exposure pixels is taken as example for the following embodiment. However, please note the scope of the present invention is not limited to a pixel array having long exposure pixels and short exposure pixels and is not limited to an image sensor with such pixel array.

Figure 2:
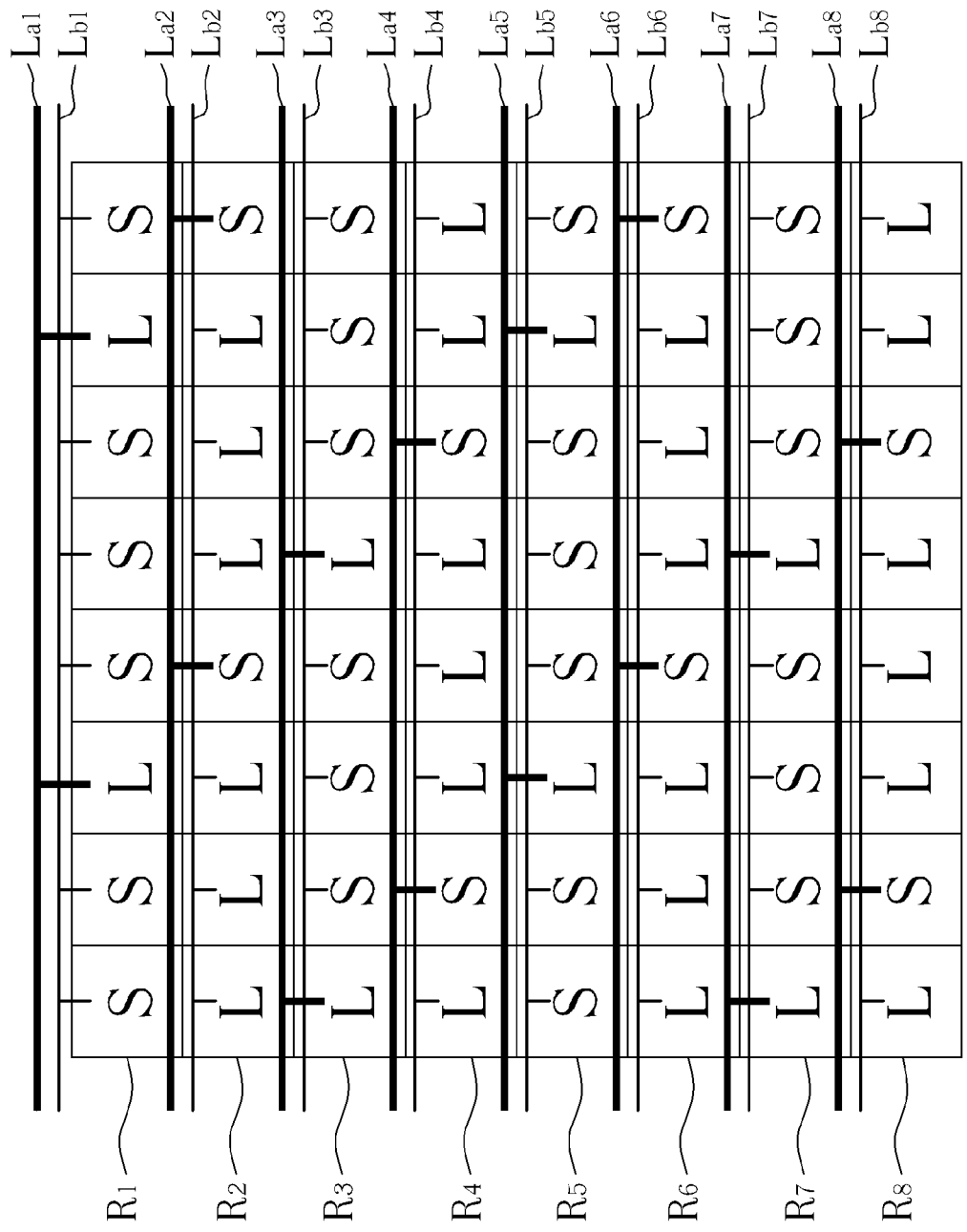
FIG. 2 is an example for an exposure pattern comprising long exposure pixels and short exposure pixels.

As above-mentioned, the control circuit 103 can control the exposure time for the pixels $PIX_{11}$-$PIX_{mn}$. Therefore an exposure pattern can be generated. FIG. 2 is an example for an exposure pattern comprising long exposure pixels and short exposure pixels. As shown in FIG. 2, rows $R_1$-$R_8$ in the pixel array respectively have several short exposure pixels S and long exposure pixels L. The short exposure pixels S are accessed via accessing lines $L_{a1}$-$L_{a8}$, and the long exposure pixels are accessed via accessing lines $L_{b1}$-$L_{b8}$. Please note the arrangement for the long exposure pixels L and the short exposure pixels S, and the arrangements for the accessing lines $L_{a1}$-$L_{a8}$/$L_{b1}$-$L_{b8}$ shown in FIG. 2 are only for example and do not mean to limit the scope of the present invention. Other arrangements should also fall in the scope of the present invention.

Figure 3:
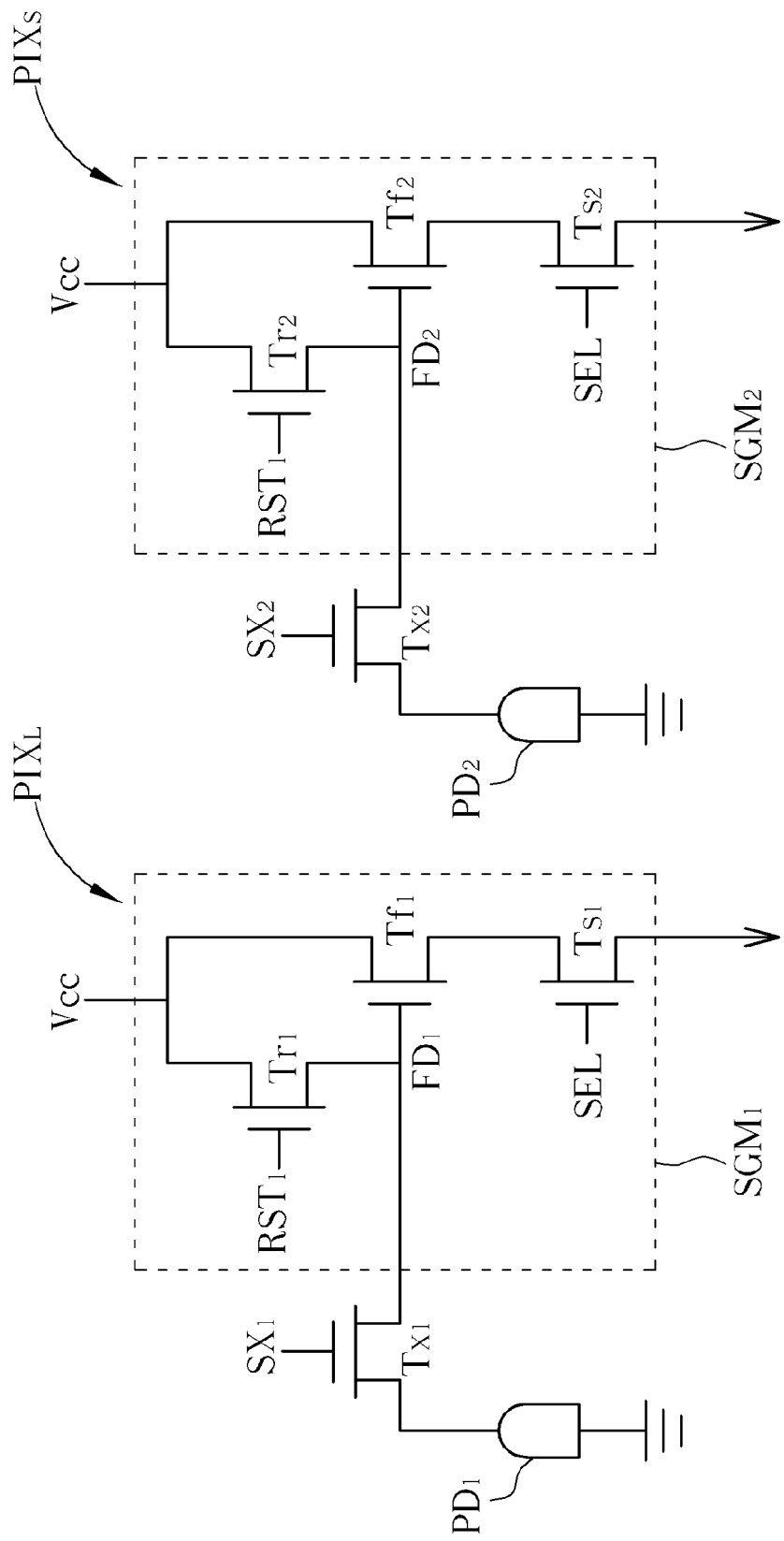
FIG. 3 is a circuit diagram illustrating a long exposure pixel and a short exposure pixel according to an embodiment of the present invention.

FIG. 3 is a circuit diagram illustrating a long exposure pixel and a short exposure pixel according to an embodiment of the present invention. The long exposure pixel $PIX_L$ (i.e. the long exposure pixel L in FIG. 2) comprises a first photodiode $PD_1$, a first image signal generating module $SGM_1$ and a first transfer switch device $T_{x1}$. The first photodiode $PD_1$ senses light to generate at least one charge. The first image signal generating module $SGM_1$ generates a first image sensing signal $IS_1$ (one of the image signals $IS_{11}$-$IS_{mn}$) according to the charge generated by the first photodiode $PD_1$. The first transfer switch device $T_{x1}$ passes the charge from the first photodiode $PD_1$ to the first image signal generating module $SGM_1$ according to a first transfer control signal $S_{x1}$.

The short exposure pixel $PIX_S$ (i.e. the short exposure pixel S in FIG. 2) comprises a second photodiode $PD_2$, a second image signal generating module $SGM_2$ and a second transfer switch device $T_{x2}$. The second photodiode $PD_2$ senses light to generate at least one charge. The second image signal generating module $SGM_2$ generates a second image sensing signal $IS_2$ (one of the image signals $IS_{11}$-$IS_{mn}$) according to the charge generated by the second photodiode $PD_2$. The second transfer switch device $T_{x2}$ passes the charge from the second photodiode $PD_2$ to the second image signal generating module $SGM_2$ according to a second transfer control signal $S_{x2}$.

In one embodiment, the first image signal generating module $SGM_1$ and the second image signal generating module $SGM_2$ both have a 4 T pixel structure. That is, the first image signal generating module $SGM_1$ has a floating diffusion $FD_1$, a first reset transistors $T_{r1}$, a first source follower $T_{f1}$, and a first row selecting transistor $T_{s1}$, the second image signal generating module $SGM_2$ has a floating diffusion $FD_2$, a second reset transistors $T_{r2}$, second a source follower $T_{f2}$, and a second row selecting transistor $T_{s2}$. Persons skilled in the art can easily understand the operation the first image signal generating module $SGM_1$ and the second image signal generating module $SGM_2$, thus are not described in detail. However, please note the circuit structures for the first image signal generating module $SGM_1$ and the second image signal generating module $SGM_2$ in FIG. 3 are only for example and do not mean to limit the scope of the present invention. For example, the selecting transistors $T_{s1}$ and $T_{s2}$ can be omitted in other embodiments.

Figure 4:
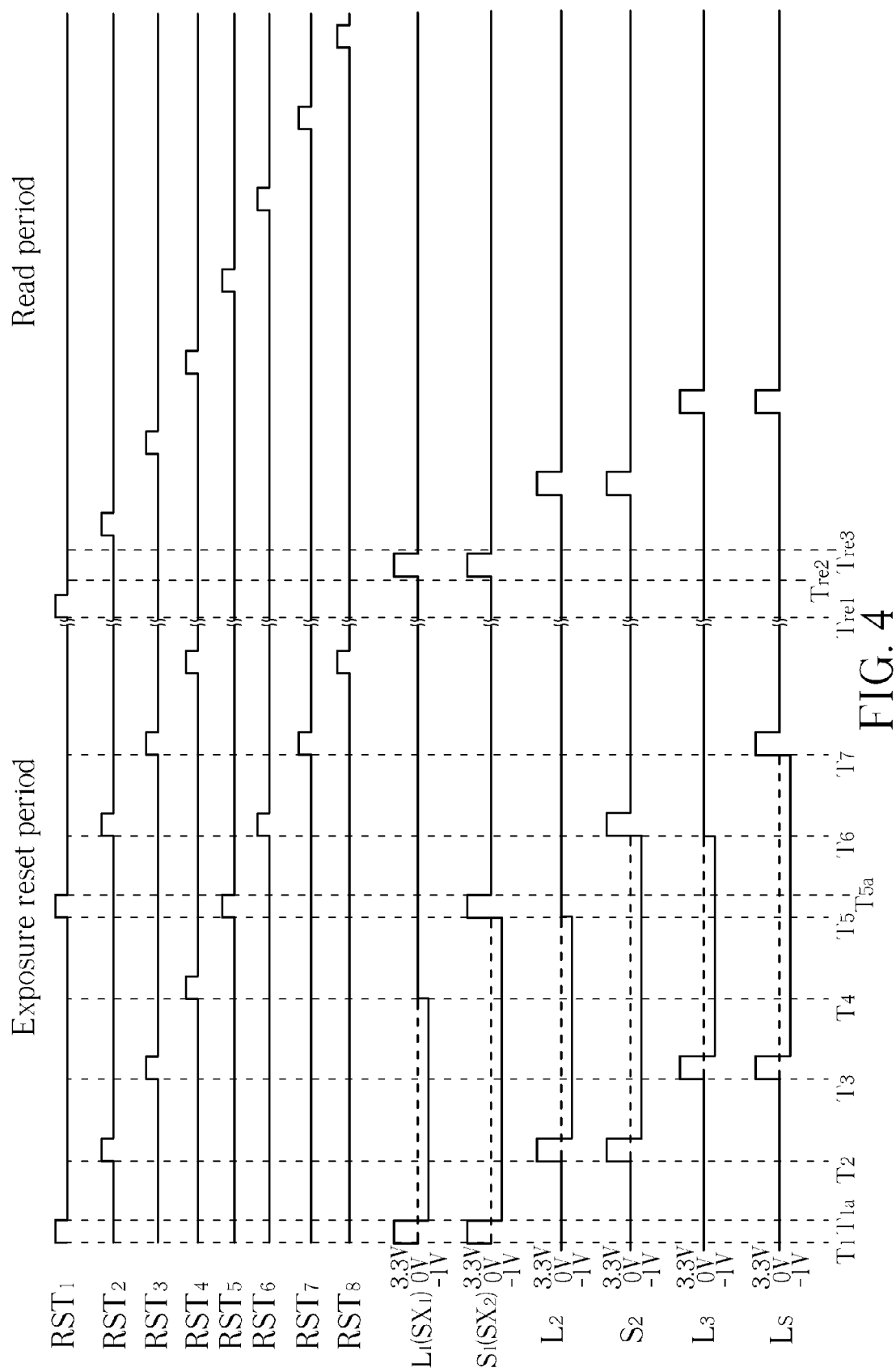
FIG. 4 is a timing diagram illustrating the reset operation for the image sensor shown in FIG. 2.

FIG. 4 is a timing diagram illustrating the operation for the image sensor shown in FIG. 2. The image sensor 100 first enters the exposure reset period at time $T_1$. The reset signals $RST_1$ to $RST_8$ respectively control the reset transistor (ex. $T_{r1}$, $T_{r2}$ in FIG. 3) for different rows. For more detail, the reset signal $RST_1$ controls the reset transistor in the pixels for the first row $R_1$ in FIG. 2, the reset signal $RST_2$ controls the reset transistor in the pixels for the second row $R_2$ in FIG. 2, and so on. In this embodiment, the first row $R_1$ is taken for example, and the long exposure pixel $PIX_L$ and the short exposure pixel $PIX_S$ are in the first row $R_1$ (but not limit). The transfer control signals, $L_1$, $S_1$, $L_2$, $S_2$ and etc. indicate the signals for respectively controlling the transfer switch devices for long exposure pixels and short exposure pixels of different rows. For example, the first transfer control signal $L_1$ indicates the signal for controlling the transfer switch devices for long exposure pixels in the first row $R_1$, and the second transfer control signal $S_1$ indicates the signal for controlling the transfer switch devices for short exposure pixels in the first row $R_1$. Therefore, the first transfer control signal $L_1$ indicates the first transfer control signal $S_{x1}$ in FIG. 3, and the second transfer control signal $S_1$ indicates the second transfer control signal $S_{x2}$ in FIG. 3. The reset and exposure are in a row-by row basis and only the operation of the first row is described.

As shown in FIG. 4, in the exposure reset period, the control circuit 103 first resets the long exposure pixels of the first row at a first resetting time $T_1$ by asserting the reset signals $RST_1$ and the first transfer control signal $L_1$ to turn on the first row of the reset transistors and the transfer switch devices of long exposure pixels. It should be noted that the second transfer control signal $S_1$ may be or not asserted. After the long exposure pixel reset, the reset signals $RST_1$ and the first transfer control signal $L_1$ are de-asserted to turn off the first row of the reset transistors and the transfer switch devices of long exposure pixels, wherein the first transfer control signal $L_1$ is set to a first predetermined control voltage, which is −1V in this embodiment, to fully turn off the transfer switch devices for long exposure pixels, and, in order to avoid charge leakage to the neighboring short exposure pixel, the first transfer control signal $L_1$ is thereafter, in time $T_4$ in this embodiment, set as a second predetermined control voltage, which is 0V in this embodiment, to substantially turn off the transfer switch devices for long pixels but not as tight as the first predetermined control voltage does. Then, at the second resetting time point $T_5$, the control circuit 103 resets the short exposure pixels of the first row by asserting the reset control signal $RST_1$ and the second transfer control signal $S_1$, such that the short exposure pixels have shorter exposure time than the long exposure pixels.

In this embodiment, the second resetting time $T_5$ depends on the desired exposure time of the short pixel. In the first row, the long exposure phase of the long exposure pixel is from time $T_{1a}$ to time $T_{re1}$, while the short exposure phase of the short exposure pixel is from time $T_{5a}$ to time $T_{re1}$.

Please note that the above mentioned second predetermined control voltage (ex. 0v) is used to substantially turn off the transfer switch device, but not fully off as the first predetermined control voltage (ex. −1v), so as to provide another likely charge leakage path via the transfer switch device to eliminate the charge leakage to the neighbor pixels through other paths, such as the substrate. The first transfer control signal $L_1$, for the long exposure pixels, is first set at the first predetermined control voltage (−1V) at time $T_{1a}$, and then set at the second predetermined control voltage (0V) just before the short exposure phase of the short exposure pixels. Therefore, the first transfer control signal $L_1$ can be set at the second predetermined control voltage just before $T_{5a}$ or earlier at $T_4$ in this example.

It is sufficient to use the second predetermined control voltage only in the transfer control signal $L_1$ during or before the short exposure phase of the short exposure pixel, while in this embodiment the second predetermined control voltage is used in both the transfer control signals $L_1$ and $S_1$ due to other design concern.

After exposure reset period, the image sensor 100 enters the read period shown in FIG. 4 at time $T_{re1}$. First, the reset transistors of a first row are turned on to reset the floating diffusions, such $FD_1$ and $FD_2$ shown in FIG. 3, by asserting the reset signal $RST_1$ at time $T_{re1}$. After floating diffusion reset, a first readout from the source follower (such as $T_{f1}$ and $T_{f2}$ in FIG. 3) is performed at time $T_{re2}$ to output a first sample. Then the transistors of a first row are turned on for the charges of the photodiodes to transfer to the floating diffusions, and a second readout from the source follower is performed to output a second sample at time $T_{re3}$. The first read out and the second readout are used for charge couple sampling (CDS) readout. The other rows are read same as the first row and details would not be repeated.

In the above-mentioned embodiments, the long exposure pixel and the short exposure pixel are in the same first row $R_1$. However, the above-mentioned reset operations can be applied to the long exposure pixel and the short exposure pixel in different rows. Also, the pixel array according to the present invention is not limited to be provided in an image sensor. The pixel array can be provided in other devices.

In view of above-mentioned embodiments, an image sensor according to an embodiment of the present invention can be summarized as follows:

An image sensor comprises a control circuit, a pixel array and an analog to digital converter. The pixel array comprises at least one long exposure pixel and at least one short exposure pixel. The long exposure pixel comprises a first photodiode, for sensing light to generate at least one charge, a first image signal generating module, for generating a first image sensing signal according to the charge generated by the first photodiode; and a first transfer switch device, for passing the charge from the first photodiode to the first image signal generating module according to a first transfer control signal. The short exposure pixel comprises a second photodiode, for sensing light to generate at least one charge; a second image signal generating module, for generating a second image sensing signal according to the charge generated by the second photodiode; and a second transfer switch device, for passing the charge from the second photodiode to the second image signal generating module according to a second transfer control signal. The control circuit sets the first transfer control signal to be a first predetermined control voltage to turn off the first transfer switch device when the long exposure pixel is in an long exposure phase, and then the control circuit sets the first transfer control signal to be a second predetermined control voltage slightly higher than the first predetermined control voltage to substantially turn off the first transfer switch device when the short exposure pixel is in a short exposure phase.

The above-mentioned pixel array is not limited to be applied to the image sensor but can be applied to other devices.

Figure 5:
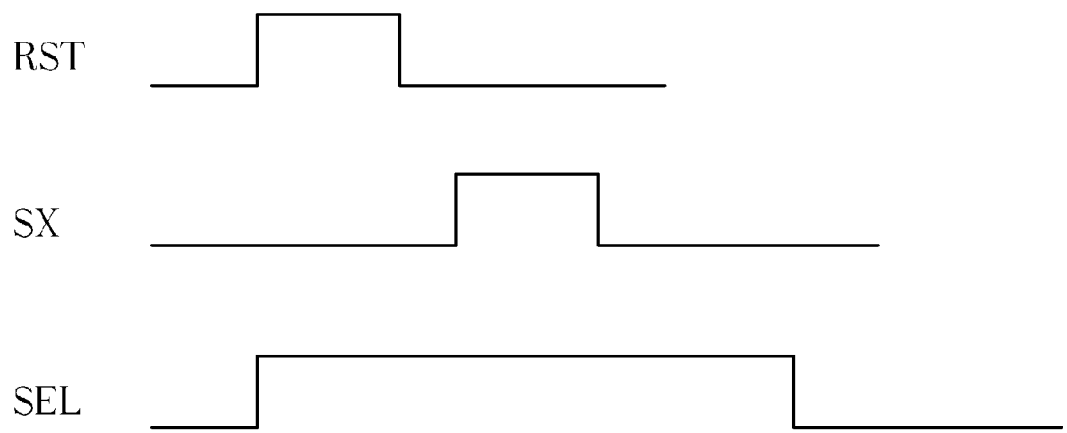
FIG. 5 is a wave chart illustrating the reading operation for the image sensor shown in FIG. 2.

FIG. 5 is a wave chart illustrating the reading operation for the image sensor shown in FIG. 2. As shown in FIG. 5, the reset signal RST for controlling the reset transistor is asserted first, therefore the reset transistors (ex. $T_{r1}$, $T_{r2}$) are turned on first. After that, the control signals $S_x$ are asserted, therefore the transfer switch devices (ex. $T_{x1}$, $T_{x2}$) are turned on. Also, the read operation is performed only when source follower transistors (ex. $T_{f1}$, $T_{f2}$) are conductive, that is, the selecting signal SEL is high. However, please note the image signal generating modules in the embodiments shown in FIG. 3 may have different structures, as above-mentioned. Therefore, the signals shown in FIG. 5 may also have different relations if the image signal generating modules have different structures.

In view of above-mentioned embodiments, the control terminals for the long exposure pixel or the short exposure pixel are asserted to a higher level before the data in the pixels are read. Therefore the photo diode accumulates less charge and the leakage current is suppressed. By this way, the bloom issue can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor, comprising:
   a control circuit;
   a pixel array, comprising:
   at least one long exposure pixel, comprising:
      a first photodiode, for sensing light to generate at least one charge;
      a first image signal generating module, comprising a first reset transistor having a first terminal coupled to a first voltage source and a second terminal coupled to the first transfer switch device, for generating a first image sensing signal according to the charge generated by the first photodiode; and
      a first transfer switch device, for passing the charge from the first photodiode to the first image signal generating module according to a first transfer control signal;
   at least one short exposure pixel, comprising;
      a second photodiode, for sensing light to generate at least one charge;
      a second image signal generating module, comprising a second reset transistor having a first terminal coupled to the first voltage source and a second terminal coupled to the second transfer switch device, for generating a second image sensing signal according to the charge generated by the second photodiode; and
      a second transfer switch device, for passing the charge from the second photodiode to the second image signal generating module according to a second transfer control signal;
   wherein the control circuit sets the first transfer control signal to be a first predetermined control voltage to turn off the first transfer switch device when the long exposure pixel is in an long exposure phase, and then the control circuit sets the first transfer control signal to be a second predetermined control voltage slightly higher than the first predetermined control voltage to substantially turn off the first transfer switch device when the short exposure pixel is in a short exposure phase;
   wherein the control circuit asserts the first transfer control signal to be the second predetermined control voltage level before the short exposure phase ends;
   an analog to digital converter, for generating a frame according to the first image sensing signal and the second image sensing signal.

2. The image sensor of claim 1, wherein the long exposure pixel is beside the short exposure pixel.

3. The image sensor of claim 1, wherein the long exposure pixels and the short exposure pixels are all provided in a row.

4. The image sensor of claim 1, wherein the control circuit sets the first transfer control signal to be the first predetermined control voltage and the second control voltage before a reading operation for the long exposure pixel.

5. A pixel array, comprising:
   a control circuit;
   at least one long exposure pixel, comprising:
      a first photodiode, for sensing light to generate at least one charge;
      a first image signal generating module, comprising a first reset transistor having a first terminal coupled to a first voltage source and a second terminal coupled to the first transfer switch device, for generating a first image sensing signal according to the charge generated by the first photodiode; and
      a first transfer switch device, for passing the charge from the first photodiode to the first image signal generating module according to a first transfer control signal;
   at least one short exposure pixel, comprising;
      a second photodiode, for sensing light to generate at least one charge;
      a second image signal generating module, comprising a second reset transistor having a first terminal coupled to the first voltage source and a second terminal coupled to the second transfer switch device, for generating a second image sensing signal according to the charge generated by the second photodiode; and
      a second transfer switch device, for passing the charge from the second photodiode to the second image signal generating module according to a second transfer control signal;
   wherein the control circuit sets the first transfer control signal to be a first predetermined control voltage to turn off the first transfer switch device when the long exposure pixel is in an long exposure phase, and then the control circuit sets the first transfer control signal to be a second predetermined control voltage slightly higher than the first predetermined control voltage to substantially turn off the first transfer switch device when the short exposure pixel is in a short exposure phase; wherein the control circuit asserts the first transfer control signal to be the second predetermined control voltage level before the short exposure phase ends.

6. The pixel array of claim 5, wherein the long exposure pixel is beside the short exposure pixel.

7. The pixel array of claim 5, wherein the long exposure pixels and the short exposure pixels are all provided in a row.

8. The pixel array of claim 5, wherein the control circuit sets the first transfer control signal to be the first predetermined control voltage and the second control voltage before a reading operation for the long exposure pixel.

* * * * *